United States Patent
Lu et al.

(10) Patent No.: US 11,120,185 B2
(45) Date of Patent: Sep. 14, 2021

(54) HARDWARE INCREMENTAL MODEL CHECKING VERIFICATION

(71) Applicant: International Business Machines Corporation, Armonk, NY (US)

(72) Inventors: Yan Heng Lu, Shanghai (CN); Chen Qian, Shanghai (CN); Zhen Peng Zuo, Shanghai (CN); Heng Liu, Shanghai (CN); Peng Fei Gou, Shanghai (CN); Yang Fan Liu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 16/203,716

(22) Filed: Nov. 29, 2018

(65) Prior Publication Data

US 2020/0175128 A1    Jun. 4, 2020

(51) Int. Cl.
*G06F 30/30*    (2020.01)
*G06F 30/33*    (2020.01)
*G06F 30/331*    (2020.01)
*G06F 115/10*    (2020.01)

(52) U.S. Cl.
CPC .......... *G06F 30/33* (2020.01); *G06F 30/331* (2020.01); *G06F 2115/10* (2020.01)

(58) Field of Classification Search
CPC ..... G06F 30/33; G06F 30/331; G06F 2115/10
USPC ........................................................ 716/107
See application file for complete search history.

(56) References Cited

U.S. PATENT DOCUMENTS

| | | | |
|---|---|---|---|
| 6,625,759 B1 * | 9/2003 | Petsinger | G06F 11/261 714/21 |
| 7,231,619 B1 | 6/2007 | Agmon | |
| 8,397,189 B2 | 3/2013 | Paruthi et al. | |
| 8,996,339 B2 | 3/2015 | Chockler et al. | |
| 9,235,669 B2 * | 1/2016 | Přikryl | G06F 30/20 |
| 9,483,593 B2 | 11/2016 | Hartung et al. | |

OTHER PUBLICATIONS

Muralidhar Talupur, "Hardware model checking: Status, challenges, and opportunites," IEEE Xplore Digital Library, Oct. 30-Nov. 2011 [Abstract Only].
Chockler et al, "Incremental formal verification of hardware," IEEE Xplore Digitial Libary, Oct. 30-Nov. 2, 2011.
IBM, Baumgartner, et al. "An Iterative Method to Reduce State Space for Efficient Formal Verification", RD v41 n407 03-98 article 40776, IP.com No. IPCOM000122984D, Mar. 1, 1998.

* cited by examiner

*Primary Examiner* — Jack Chiang
*Assistant Examiner* — Brandon Bowers

(57) ABSTRACT

The computer processor identifies a first shared set of input ports that are common to a first hardware model and a second hardware model and a second shared set of input ports that are common to a first reference model and a second reference model. The computer processor selects logic of the first hardware model and logic of the second hardware model that are each traceable to the first shared set of input ports and selects logic of the first reference model and logic of the second reference model that are each traceable to the second shared set of input ports. The computer processor determines that the logic of the second hardware model and the logic of the second reference model have verified logic by determining that the logic of the first hardware model is equivalent to the logic of the second hardware model and the logic of the first reference model is equivalent to the logic of the second reference model.

20 Claims, 10 Drawing Sheets

700

---

705 — RECEIVE A NETLIST OF A FIRST HARDWARE MODEL AND A FIRST REFERENCE MODEL CORRESPONDING TO A FIRST PROCESSOR INSTRUCTION, THE FIRST HARDWARE MODEL AND THE FIRST REFERENCE MODEL EACH HAVING VERIFIED LOGIC, THE FIRST HARDWARE MODEL HAVING A FIRST PLURALITY OF INPUT PORTS AND THE FIRST REFERENCE MODEL HAVING A SECOND PLURALITY OF INPUT PORTS

710 — RECEIVE A NETLIST OF A SECOND HARDWARE MODEL AND A SECOND REFERENCE MODEL CORRESPONDING TO A SECOND PROCESSOR INSTRUCTION, THE SECOND HARDWARE MODEL AND THE SECOND REFERENCE MODEL EACH HAVING UNVERIFIED LOGIC, THE SECOND HARDWARE MODEL HAVING A THIRD PLURALITY OF INPUT PORTS AND THE SECOND REFERENCE MODEL HAVING A FOURTH PLURALITY OF INPUT PORTS

715 — IDENTIFY A FIRST SET OF INPUT PORTS THAT DIFFER BETWEEN THE FIRST PLURALITY OF INPUT PORTS AND THE THIRD PLURALITY OF INPUT PORTS

720 — TAKE THE REMAINING PORTS OF THE FIRST SET AS A FIRST SHARED SET OF INPUT PORTS THAT ARE COMMON TO THE FIRST PLURALITY OF INPUT PORTS AND THE THIRD PLURALITY OF INPUT PORTS

725 — IDENTIFY A SECOND SET OF INPUT PORTS THAT DIFFER BETWEEN THE SECOND PLURALITY OF INPUT PORTS AND THE FOURTH PLURALITY OF INPUT PORTS

730 — TAKE THE REMAINING PORTS OF THE SECOND SET AS A SECOND SHARED SET OF INPUT PORTS THAT ARE COMMON TO THE SECOND PLURALITY OF INPUT PORTS AND THE FOURTH PLURALITY OF INPUT PORTS

HARDWARE INCREMENTAL MODEL CHECKING VERIFICATION

BACKGROUND

The present invention relates to scaling logic verification, and more specifically, to incremental model checking verification of similar computer instructions.

Contemporary hardware designs are typically complex and include a diversity of different logic such as bit-level control logic, data paths of various types (e.g., including pipeline stages, queues, and RAM) with error identification logic, performance related artifacts (e.g., pipelining, multi-threading, out-of-order execution, and power saving techniques), and pervasive logic artifacts used to initialize the design, monitor its runtime execution, and detect and cope with faults. While verifying hardware designs is necessary, the increased complexity of hardware designs has made verification more difficult.

Such designs are further complicated by the multi-dimensional optimization criteria including delay, area, and power, as well as the inclusion of logic to increase testability, reliability, and configurability. The verification of such complex systems has grown to be extremely challenging if not intractable, with verification resource demands having eclipsed the cost of all other aspects of the production of such systems, while nevertheless often entailing the risk of missed subtle design flaws. Such design flaws—especially in hardware—can be exorbitantly expensive to repair if exposed late and cause product delays.

Verification generally entails formal model checking of exponentially-growing complexity with respect to the size of the design under verification. Some verification techniques are more seriously hindered by certain design components than others. For example, techniques that leverage a canonical representation of design functionality may be more hindered by the number of primary inputs of the design than other size metrics since a functional view (e.g., a truth table) is exponential in size with respect to the number of inputs. The number of gates of a design often imposes a significant impact on the complexity of analysis of the design functionality since this often means that design function is often more complicated.

SUMMARY

According to one embodiment, a computer processor receives a first hardware model and a first reference model corresponding to a first processor instruction. The first hardware model and the first reference model each have verified logic. The first hardware model has a first plurality of input ports and the first reference model has a second plurality of input ports. The computer processor receives a second hardware model and a second reference model corresponding to a second processor instruction. The second hardware model and the second reference model each have unverified logic. The second hardware model has a third plurality of input ports and the second reference model has a fourth plurality of input ports. The computer processor identifies a first shared set of input ports that are common to the first plurality of input ports and the third plurality of input ports and identifies a second shared set of input ports that are common to the second plurality of input ports and the fourth plurality of input ports. The computer processor selects logic of the first hardware model corresponding to a sub-instruction of the first processor instruction and logic of the second hardware model corresponding to the sub-instruction of the second processor instruction that are each traceable to the first shared set of input ports and selects logic of the first reference model corresponding to the sub-instruction of the first processor instruction and logic of the second reference model corresponding to the sub-instruction of the second processor instruction that are each traceable to the second shared set of input ports. The computer processor determines that the logic of the second hardware model and the logic of the second reference model have verified logic by determining that the logic of the first hardware model is equivalent to the logic of the second hardware model and the logic of the first reference model is equivalent to the logic of the second reference model.

According to one embodiment, a computer program product includes computer-readable program code executable to perform operations that include receiving a first hardware model and a first reference model corresponding to a first processor instruction, the first hardware model and the first reference model each having verified logic, the first hardware model having a first plurality of input ports and the first reference model having a second plurality of input ports. The operations further include receiving a second hardware model and a second reference model corresponding to a second processor instruction, the second hardware model and the second reference model each having unverified logic, the second hardware model having a third plurality of input ports and the second reference model having a fourth plurality of input ports. The operations further include identifying a first shared set of input ports that are common to the first plurality of input ports and the third plurality of input ports. The operations further include identifying a second shared set of input ports that are common to the second plurality of input ports and the fourth plurality of input ports. The operations further include selecting logic of the first hardware model corresponding to a sub-instruction of the first processor instruction and logic of the second hardware model corresponding to the sub-instruction of the second processor instruction that are each traceable to the first shared set of input ports. The operations further include selecting logic of the first reference model corresponding to the sub-instruction of the first processor instruction and logic of the second reference model corresponding to the sub-instruction of the second processor instruction that are each traceable to the second shared set of input ports. The operations further include determining that the logic of the second hardware model and the logic of the second reference model have verified logic by determining that the logic of the first hardware model is equivalent to the logic of the second hardware model and the logic of the first reference model is equivalent to the logic of the second reference model.

According to one embodiment, a computing system that includes a computing processor and a memory comprising a program that when executed by the processor is configured to receive a first hardware model and a first reference model corresponding to a first processor instruction, the first hardware model and the first reference model each having verified logic, the first hardware model having a first plurality of input ports and the first reference model having a second plurality of input ports. The program is further configured to receive a second hardware model and a second reference model corresponding to a second processor instruction, the second hardware model and the second reference model each having unverified logic, the second hardware model having a third plurality of input ports and the second reference model having a fourth plurality of input ports. The program is further configured to identify a first shared set of input ports that are common to the first plurality of input ports and the third plurality of input ports. The program is further configured to identify a second shared set of input ports that are common to the second plurality of input ports and the fourth plurality of input ports. The program is further configured to select logic of the first hardware model corresponding to a sub-instruction of the first processor instruction and logic of the second hardware model corresponding to the sub-instruction of the second processor instruction that are each traceable to the first shared set of input ports. The program is further configured to select logic of the first reference model corresponding to the sub-instruction of the first processor instruction and logic of the second reference model corresponding to the sub-instruction of the second processor instruction that are each traceable to the second shared set of input ports. The program is further configured to determine that the logic of the second hardware model and the logic of the second reference model have verified logic by determining that the logic of the first hardware model is equivalent to the logic of the second hardware model and the logic of the first reference model is equivalent to the logic of the second reference model.

BRIEF DESCRIPTION OF THE SEVERAL VIEWS OF THE DRAWINGS

FIG. 7A-7C illustrate one embodiment of a method for incremental model checking verification of similar computer instructions.

DETAILED DESCRIPTION

Embodiments of the present disclosure employ a technique of incremental model checking verification. Incremental model checking verification pre-verifies and proves sub-instructions of a model of a computer instruction prior to formal verification model checking. As used herein, a sub-instruction is a distinct unit of logic that includes a computer instruction that performs a specific function or task. A computer instruction (e.g., a processor instruction) may comprise one or more sub-instructions. In incremental model checking verification, netlist files corresponding to two similar computer instructions may be extracted from current formal verification tools. From the sub-instruction logic of the netlists of the two similar computer instructions, differences in input ports are identified. Traces through the sub-instruction logic of each of the netlists are performed to identify logic of sub-instructions of the two computer instructions that originate from the input ports shared in common between the two instructions. The logic of one of the sub-instructions of one computer instruction has already been verified by formal verification model checking, while the logic of another similar sub-instruction of a similar other computer instruction has not yet been verified by formal verification model checking. The logic of the verified sub-instruction and the logic of the un-verified similar sub-instruction are analyzed by logical induction to verify that the functionality of logic of the un-verified sub-instruction of the two computer instructions is equivalent to the logic of the verified sub-instruction. Verification is carried out by a sequence equivalency check of the verified and un-verified logic to prove that the un-verified logic produces the same outputs given the same inputs as the verified logic. This pre-proven logic of the previously un-verified sub-instruction need not undergo formal verification model checking.

This incremental model checking verification method significantly reduces the effort to be spent on multi-cases design logic for formal verification model checking. This incremental model checking verification method improves the current model checking flow of formal verification by reducing the number of instructions to be completely verified and thereby reduces computation complexity and accelerates the formal verification of a multi-cases design. Finally, this method can be integrated into current formal verification electronic design automation (EDA) flow.

Figure 1:
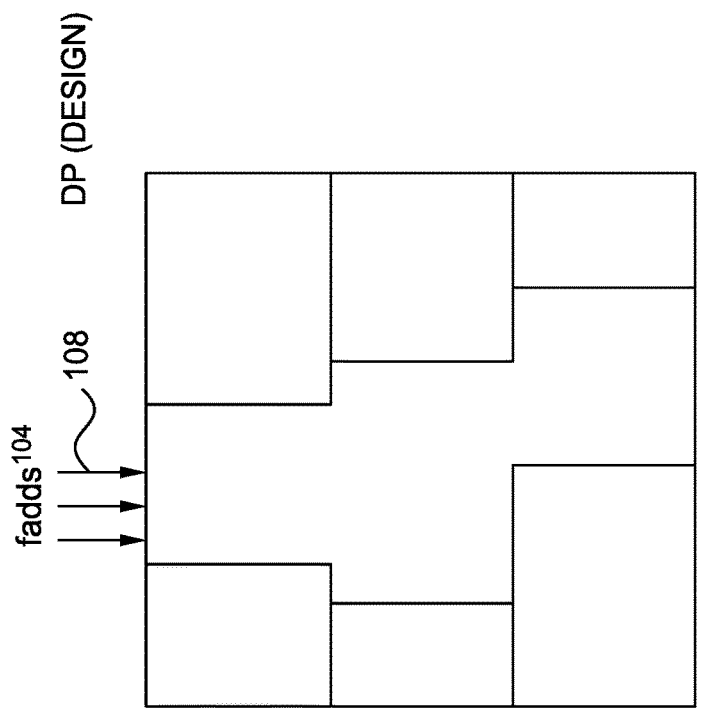
FIG. 1 is a schematic diagram of two similar computer instructions fadd and fadds.
Figure 1:
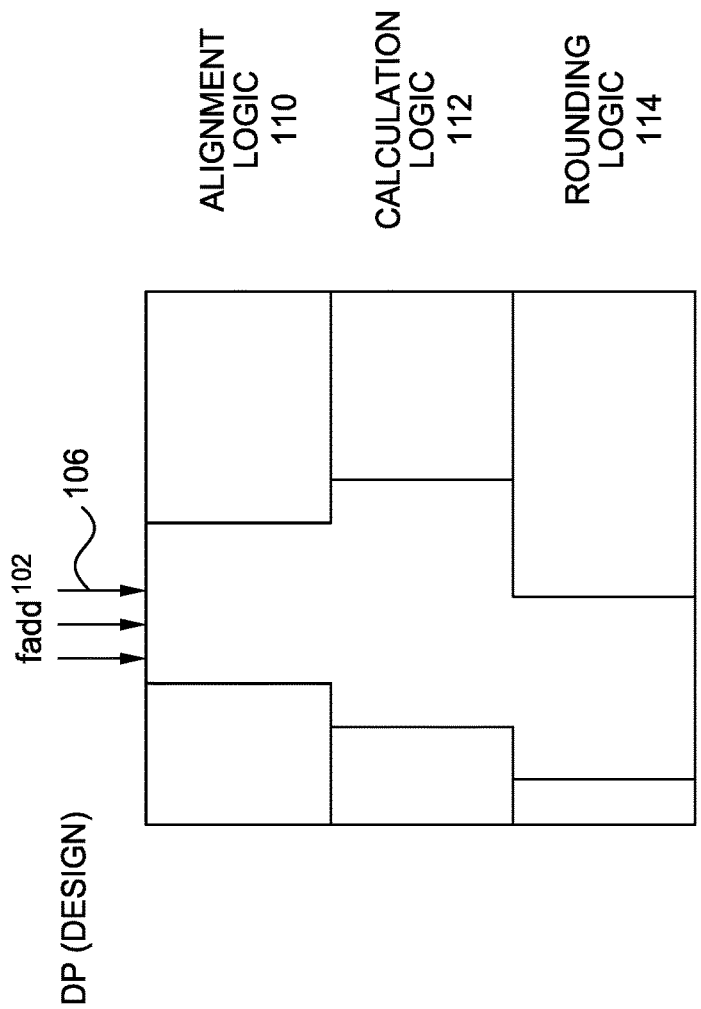

FIG. 1 is a schematic diagram of two similar computer instructions: floating point addition (fadd) 102 and fadds 104. Fadd 102 and fadds 104 each have alignment logic 110, calculation logic 112, and rounding logic 114 (sub-instructions 110, 112, 114). Fadd 102 and fadds 104 each have the same alignment logic 110 and calculation logic 112, while the only difference is the rounding logic 114. Fadd 102 rounds to double precision result and fadds 104 rounds to single precision. Similarly, the instructions fadd and fsub have the same calculation logic and rounding logic, while the only difference is the alignment logic. Similarly, fsub and fsubs have the same alignment logic and calculation logic. Fadds and fsubs have the same rounding logic. Assuming a proof of fadd, incremental formal verification of fadds/fsub/fsubs is simplified by alternatively employing incremental model checking of sub-logic corresponding to sub-instructions that are shared in common between fadd and fadds/fsub/fsubs wherein fadd has been proven by formal verification model checking and fadds/fsub/fsubs has not been proven by formal verification model checking.

Figure 2:
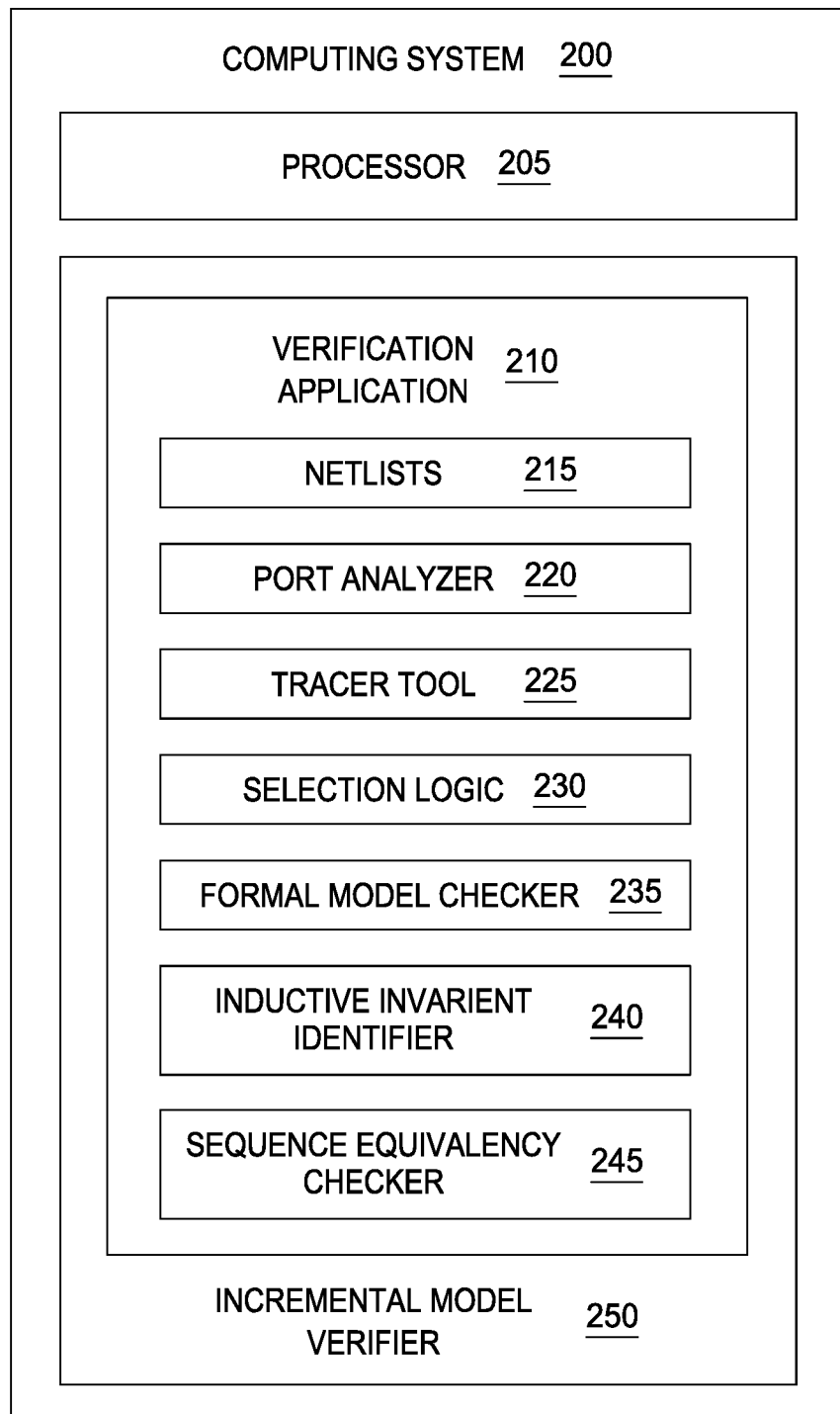
FIG. 2 illustrates a computing system for incremental model checking verification of similar computer instructions represented as netlists, according to one embodiment described herein.

FIG. 2 illustrates a computing system 200 for incremental model checking verification of similar computer instructions represented as netlists 215, according to one embodiment described herein. The computing system 200 includes a processor 205 and a verification application 210. The processor 205 represents one or more processing elements that each may include multiple processing cores. Using the processor 205, the verification application 210 can evaluate the netlists 215 corresponding to models of computer instructions that may share common sub-instruction logic. An incremental model verifier 250 is implemented in the verification application 210. The incremental model verifier 250 comprises a port analyzer 220, a tracer tool 225, selection logic 230, a formal model checker 235, an inductive invariant identifier 240, and a sequence equivalency checker 245.

The incremental model verifier 250 receives a first hardware model and a first reference model corresponding to a first processor instruction. The first hardware model and the first reference model each have verified logic. The first hardware model has a first plurality of input ports and the first reference model has a second plurality of input ports. The incremental model verifier 250 further receives a second hardware model and a second reference model corresponding to a second processor instruction. The second hardware model and the second reference model each having unverified logic. The second hardware model has a third plurality of input ports and the second reference model has a fourth plurality of input ports.

The port analyzer 220 identifies a first shared set of input ports that are common to the first plurality of input ports and the third plurality of input ports. The port analyzer 220 identifies a second shared set of input ports that are common to the second plurality of input ports and the fourth plurality of input ports. The selection logic 230 selects logic of the first hardware model corresponding to a sub-instruction of the first processor instruction and logic of the second hardware model corresponding to the sub-instruction of the second processor instruction that are each traceable to the first shared set of input ports. The selection logic 230 selects logic of the first reference model corresponding to the sub-instruction of the first processor instruction and logic of the second reference model corresponding to the sub-instruction of the second processor instruction that are each traceable to the second shared set of input ports. The tracer tool 225 identifies logic that is traceable or not traceable to input ports that are common or input ports that differ for a pair of specified models.

The inductive invariant identifier 240 determines whether the logic of the second hardware model and the logic of the second reference model have verified logic corresponding to a confirmed inductive invariant by determining whether the logic of the first hardware model is equivalent to the logic of the second hardware model and the logic of the first reference model is equivalent to the logic of the second reference model. If equivalency exists, then the logic of the specified common sub-instruction of the first computer instruction and the second computer instruction is considered proven logic. Accordingly, the inductive invariant identifier 240 foregoes formal model checking on the logic of the second hardware model and the logic of the second reference model. If the inductive invariant identifier 240 determines that the logic of the first hardware model is not equivalent to the logic of the second hardware model and/or the logic of the first reference model is not equivalent to the logic of the second reference model, then inductive invariant identifier 240 declares that the logic of the second hardware model and the logic of the second reference model retain unverified logic. Since the logic of the second hardware model and the logic of the second reference model retain unverified logic then the inductive invariant identifier 240 directs the formal model checker 235 to perform formal model checking on the logic of the second hardware model and the logic of the second reference model. In an embodiment, the inductive invariant identifier 240 determines that the logic of the first hardware model is equivalent or not equivalent to the logic of the second hardware model and/or the logic of the first reference model is equivalent or is not equivalent to the logic of the second reference model by proving that the logic of the first hardware model produces the same outputs for the same inputs as the logic of the second hardware model and proving that the logic of the first reference model produces the same outputs for the same inputs as the logic of the second reference model. In an embodiment, proving that the logic of the first hardware model produces the same outputs for the same inputs as the logic of the second hardware model and proving that the logic of the first reference model produces the same outputs for the same inputs as the logic of the second reference model comprises the sequence equivalency checker 245 of the incremental model checker 250 applying a sequence equivalence checking method to the logic of the first hardware model and the logic of the second hardware model and applying the sequence equivalence checking method to the logic of the first reference model and the logic of the second reference model.

If incremental model checker 250 determines that there is remaining unverified logic that is traceable to the first shared set of input ports and the second shared set of input ports, then processing proceeds back to incrementally verifying logic of models of a second sub-instruction common to the first processor instruction and the second processor instruction.

The hardware logic of a computer instruction can be modeled as a netlist. A netlist can be represented as a Boolean network. A Boolean network can be expressed in the form of an And-Inverter Graph (AIG). The netlist contains a directed graph with vertices representing gates, and edges representing interconnections between those gates. Each gate has zero or more input edges, indicating which gates define their semantic behavior, and zero or more output edges, indicating that other gates have their semantic behavior defined by this gate. Each gate has an associated function, such as constants, primary inputs (hereafter referred to as RANDOM gates), combinational logic such as AND gates, simple sequential elements (hereafter referred to as registers), and memory arrays. In embodiments, a netlist format is defined, which is used to represent logic systems under verification.

Figure 3:
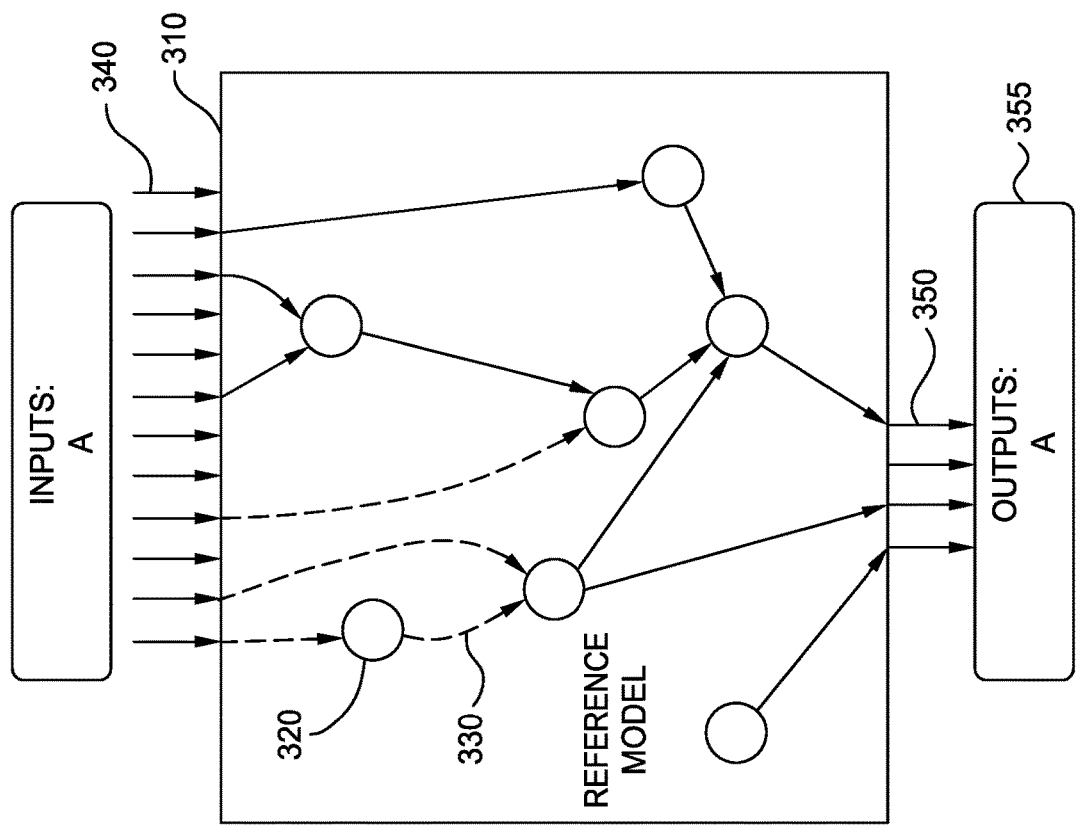
FIG. 3 shows a graph representation of a netlist corresponding to the logic of a computer instruction under test and a corresponding netlist of a confirmed reference model of the same computer instruction.
Figure 3:
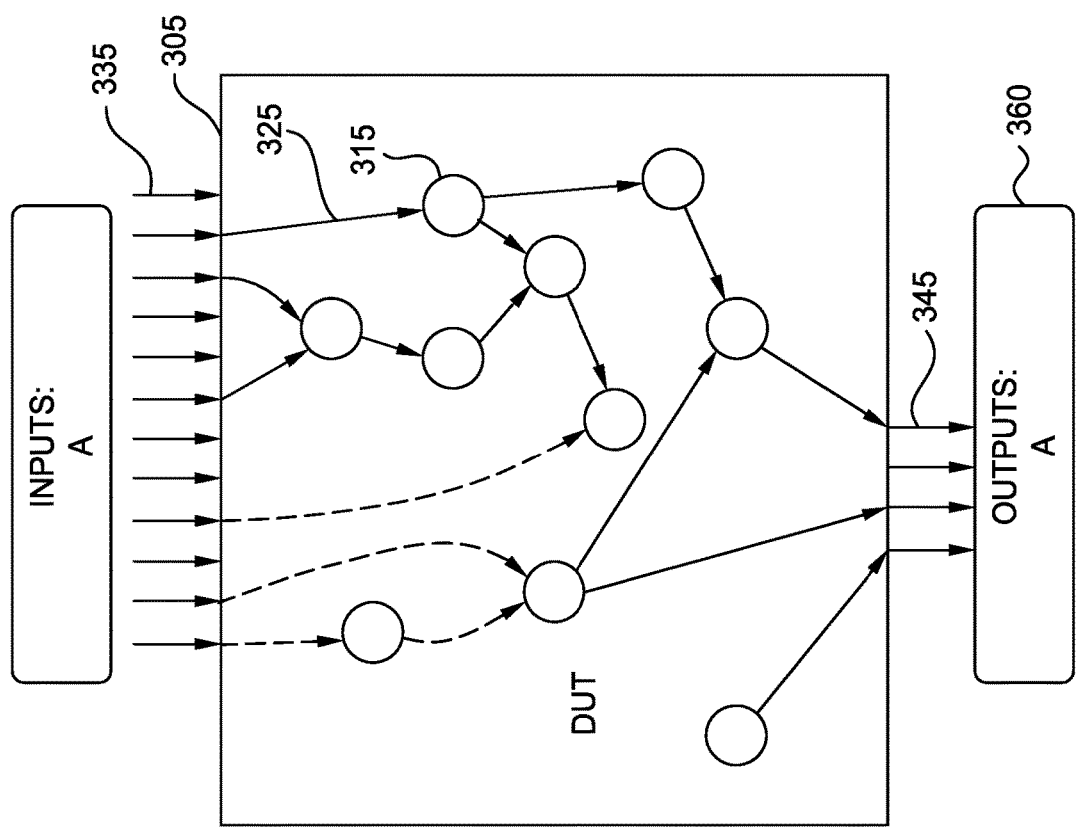

FIG. 3 shows a directed graph representation of a netlist 305 corresponding to the logic of a computer instruction under test and a corresponding netlist 310 of a confirmed (i.e., proven) reference model of the same computer instruction. Each of the netlists 305, 310 comprises a plurality vertices represented as the bubbles 315, 320 and edges 325, 330 between the vertices 315, 320. The edges 325, 330 may also be connected to a set of inputs 335, 340 and a set of outputs 345, 350. While the number of vertices and edges may internally vary between the netlists 305, 310, the number and types of inputs and outputs are the same for logic of a hardware model of a computer instruction under tests and its corresponding reference model. Signals applied to the set of inputs 335, 340 always produce the same signals at the outputs 345, 350, indicating that the netlists 315, 310 have equivalent logic designs. A proof 355 of the reference model netlist 310 is also a proof 360 of the computer instruction under test netlist 305.

Figure 4:
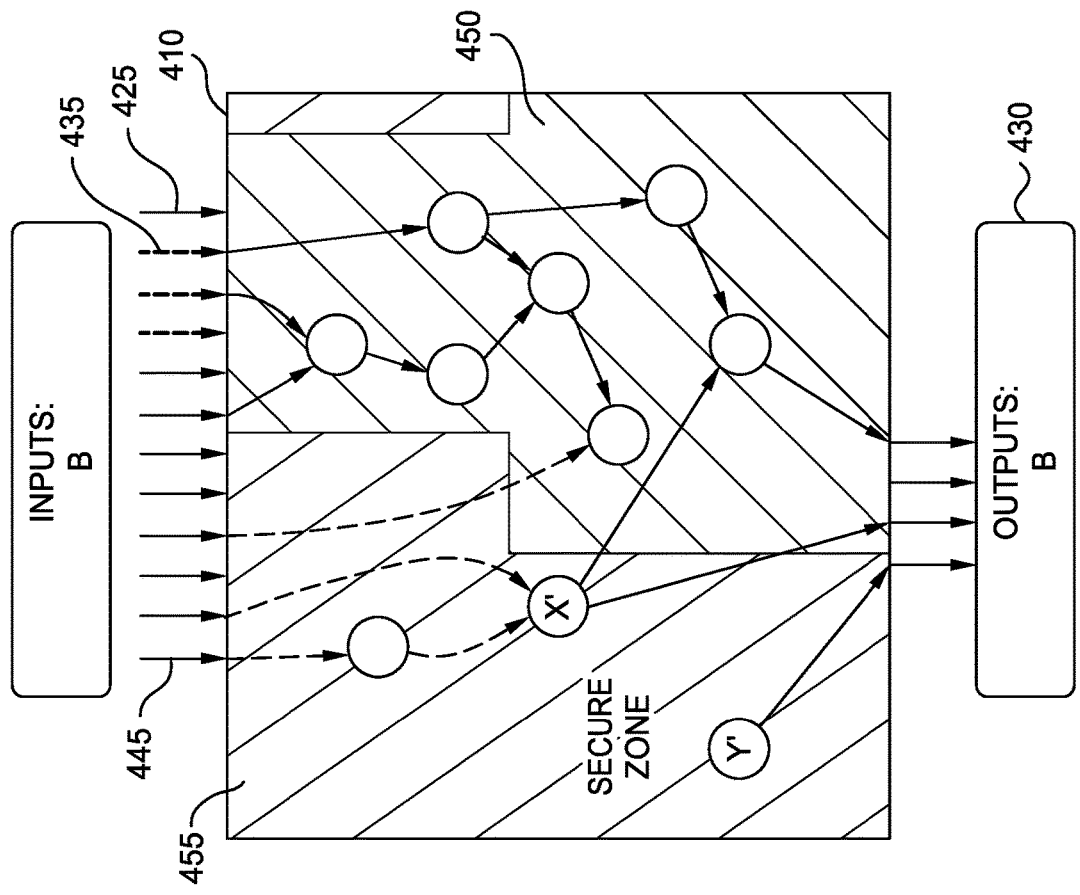
FIG. 4 shows a graph representation of a netlist corresponding to hardware design logic of an unproven computer instruction under test and a netlist corresponding to hardware design logic of a non-identical but similar proven computer instruction.
Figure 4:
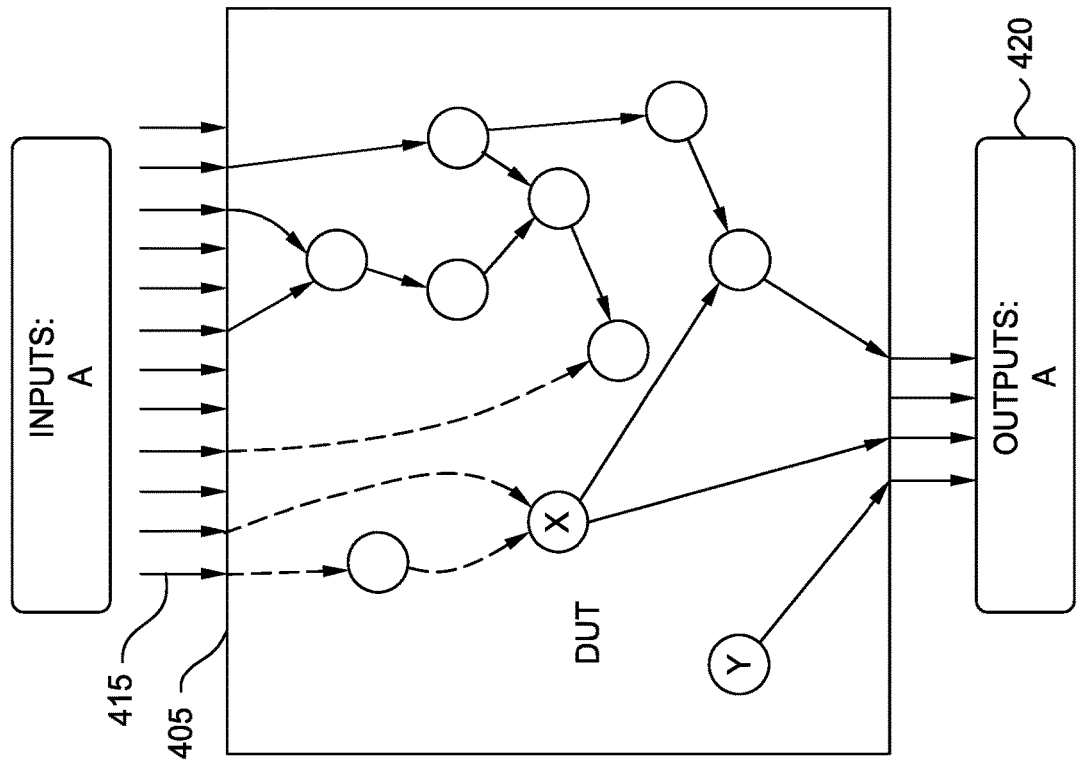

FIG. 4 shows a graph representation of a netlist 405 corresponding to a hardware logic model of an unproven computer instruction under test and a netlist 410 corresponding to a hardware model of a non-identical but similar proven computer instruction (e.g., fadd and fadds). Netlist 405 has a first set of inputs 415 and a first set of outputs 420, and intervening nodes and edges, wherein a portion of the logic corresponding to a first sub-instruction is designated by the vertices x and y. Netlist 410 has a second set of inputs 425 and a second set of outputs 430, and intervening nodes and edges, wherein a portion of the logic corresponding to a second sub-instruction is designated by the vertices x' and y'. The number and types of the inputs of the first set of inputs 415 may differ by a portion 435 of the number and types of inputs of the second set of inputs 425. The portion 435 is referred to as the differing ports 435 and the remaining common inputs 440 between the two netlists 405, 410 are referred to as shared ports 445.

The logic (edges and vertices of the graph) of the netlist 410 that is traceable to the differing ports 435 is considered risky logic 450 since it is likely to differ from logic in the netlist 405. This risky logic needs to undergo formal verification model checking. However, the logic of the netlist 410 that is traceable to the shared ports 445 is equivalent logic to corresponding logic in the netlist 405, and is designated as safe logic 455. Within the safe logic 455 is the logic of the similar sub-instructions represented by corresponding vertices x, y and x', y'. If x', y' has already undergone formal verification model checking and is considered proven logic, then it is possible to prove that the corresponding safe logic x, y is equivalent to the proven logic x', y' and is therefore also proven logic. If so, then the sub-instruction logic x, y of the netlist 405 in the safe logic 455 need not undergo formal verification model checking. This incremental model checking verification strategy can be applied to another or more sub-instructions corresponding to the safe logic 455 of netlist 405.

Figure 5:
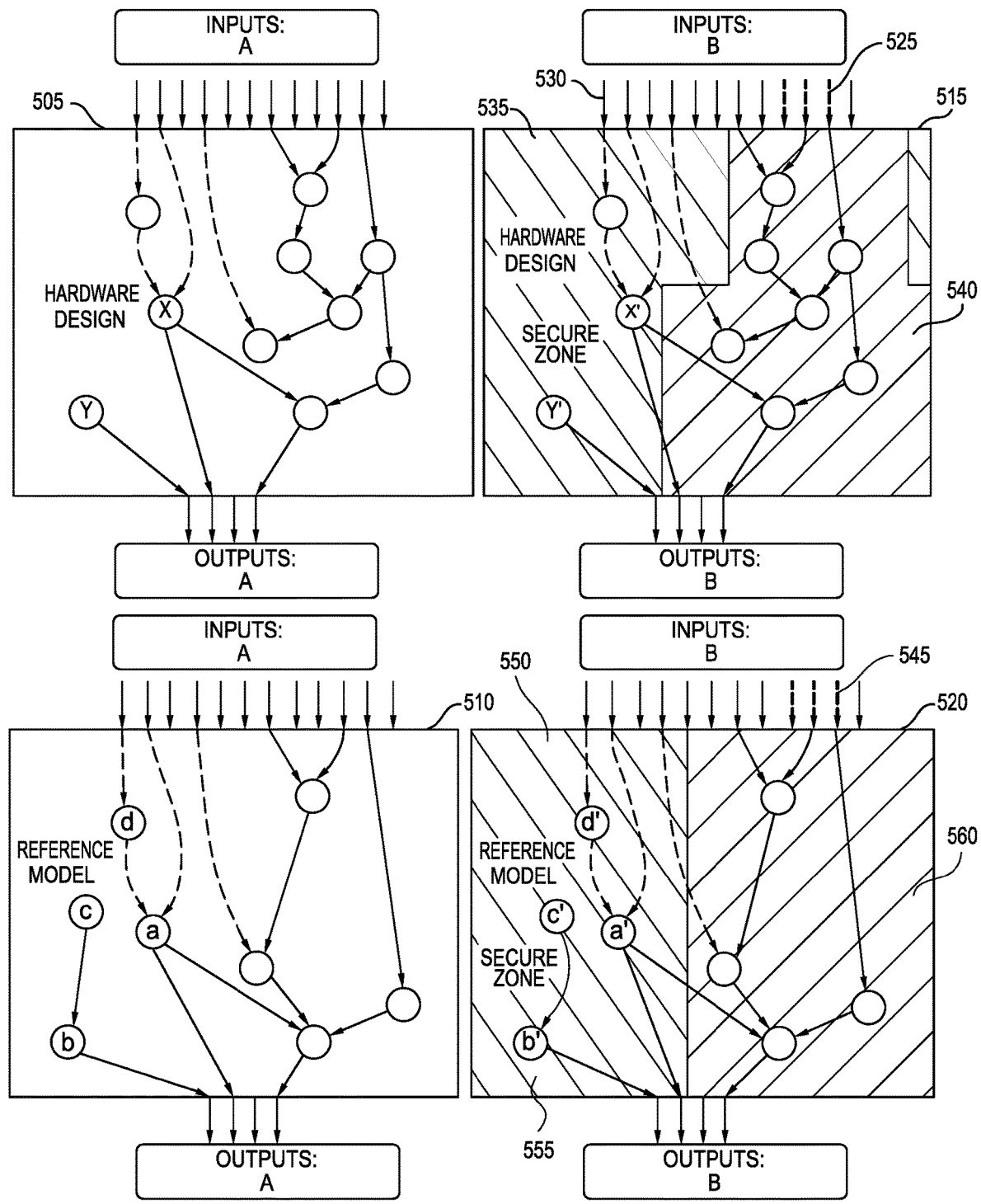
FIG. 5 shows a graph representation of a first netlist corresponding to hardware design logic of an unproven first computer instruction under test, a second netlist corresponding to reference logic of the unproven first instruction, a third netlist of a non-identical but proven hardware design logic of a second similar computer instruction, and a fourth netlist of a reference logic corresponding to the hardware design logic of the second computer instruction.

FIG. 5 shows a graph representation of a first netlist 505 corresponding to a hardware model of an unproven first computer instruction under test, a second netlist 510 corresponding to a reference model of the unproven first instruction, a third netlist 515 of a non-identical but proven hardware model of a second similar computer instruction, and a fourth netlist 520 of a reference model of the second computer instruction. The strategy of incremental model checking verification can be applied to both hardware model logic and reference model logic. First, differing and shared ports 525, 530 of the hardware models for both instructions may be identified followed by identification of safe and risky logic 535, 540 associated with the differing and shared ports in both of the netlists 505, 510. Similarly, differing and shared ports 545, 550 of the reference models for both instructions may be identified followed by identification of safe and risky logic 555, 560 associated with the differing and shared ports in both of the netlists 515, 520. Logic nodes associated of the same sub-instruction residing in the safe logic for both instructions may be identified. In the current case, these nodes are x, y and x', y' for safe sub-instructions in the netlists 505, 510 and a, b and a', b' for safe sub-instructions in the netlists 515, 520. The sub-instruction under test is designated as a potential inductive invariant. Formal inductive logic may be applied to the potential inductive invariant to prove that it is a verified inductive invariant. If the inductive invariant is correct, then the un-verified sub-instruction can be verified as proven and not have to undergo formal verification model checking.

In the example shown in FIG. 5, proving that the potential inductive invariant represented by nodes x, y, and a, b, is a verified inductive invariant having verified logic and are therefore proven logic (sub-instruction) can be accomplished by determining whether the logic represented by the nodes x', y' is equivalent to the logic represented by the nodes x, y. The latter can be proven by indirection by verifying that the logic represented nodes x, y is equivalent to the logic represented by nodes a, b and verifying that the logic represented by nodes x', y' is equivalent to the logic represented by the nodes a', b'. Proving that the logic of the two models produces the same outputs for the same inputs is a proof of equivalence between the logic of the two models. Proof of corresponding outputs being produced by signals applied to corresponding inputs can be achieved by applying a sequence equivalency checking method (SEC) to each of the logic models.

Figure 6:
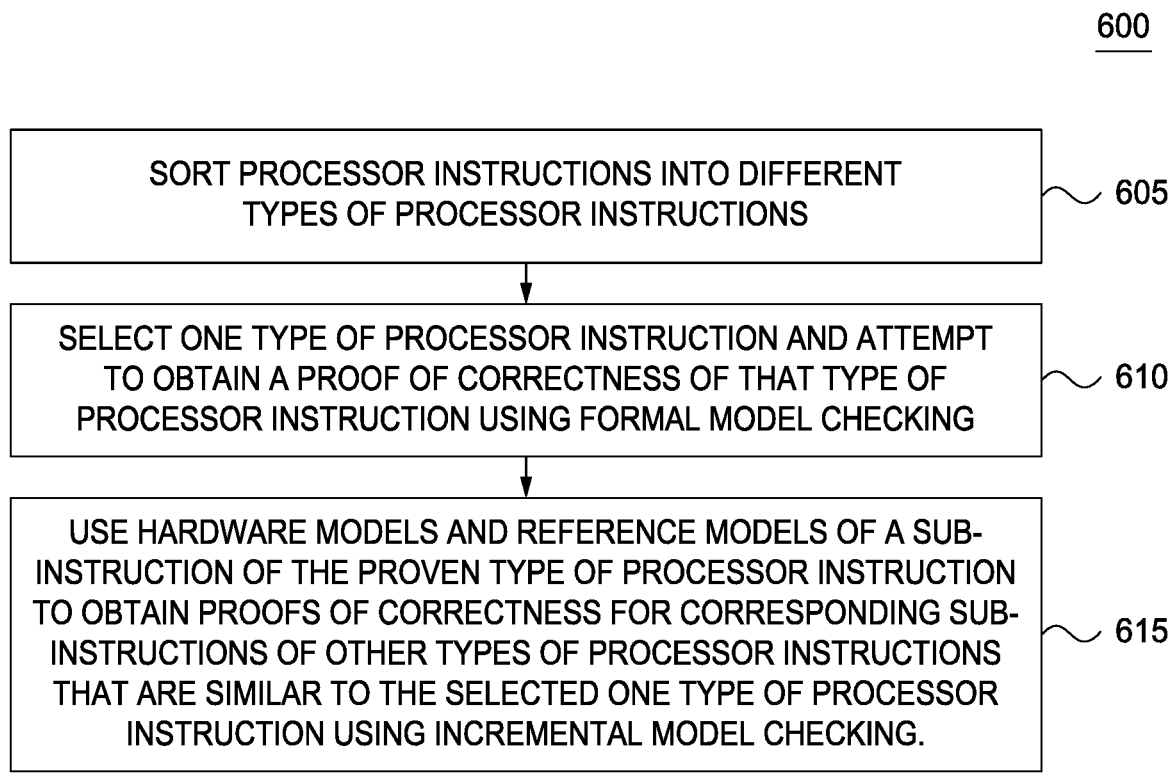
FIG. 6 illustrates one embodiment of a method for determining suitable candidate instructions for incremental model checking verification by identifying process instructions that may have sub-instructions in common.

FIG. 6 illustrates one embodiment of a method 600 for determining suitable candidate instructions for incremental model checking verification by identifying process instructions that may have sub-instructions in common. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by the incremental model verifier 250 of FIG. 2.

At block 605, the incremental model verifier 250 sorts processor instructions into different types of processor instructions. At block 610, the incremental model verifier 250 selects one type of processor instruction and attempts to obtain a proof of correctness of that type of processor instruction using formal model checking. At block 615, the incremental model verifier 250 uses hardware models and a reference models of a sub-instruction of the proven type of processor instruction to obtain proofs of correctness for corresponding sub-instructions of other types of processor instructions that are similar to the selected one type of processor instruction using incremental model checking verification.

Figure 7B:
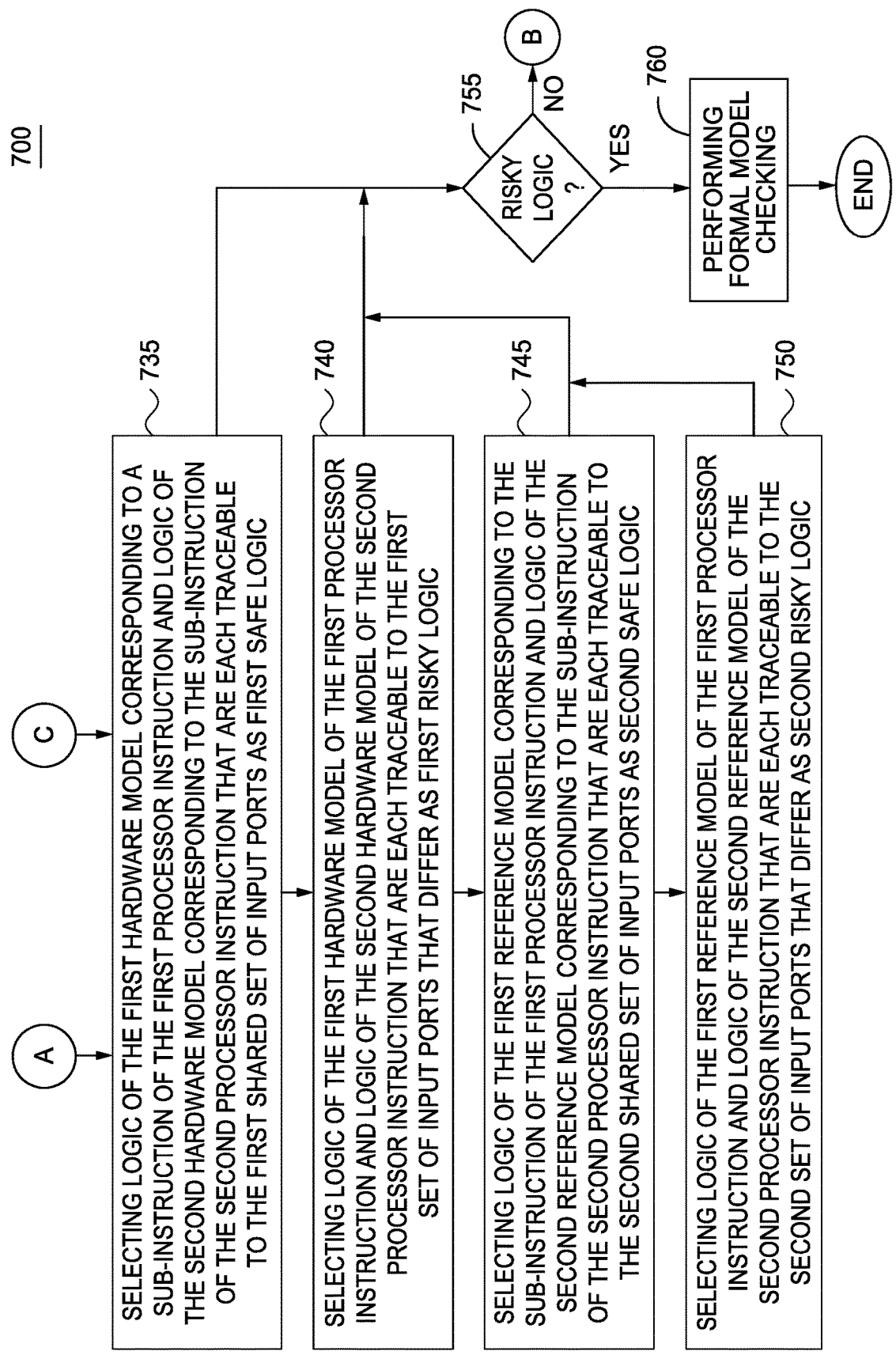
Figure 7C:
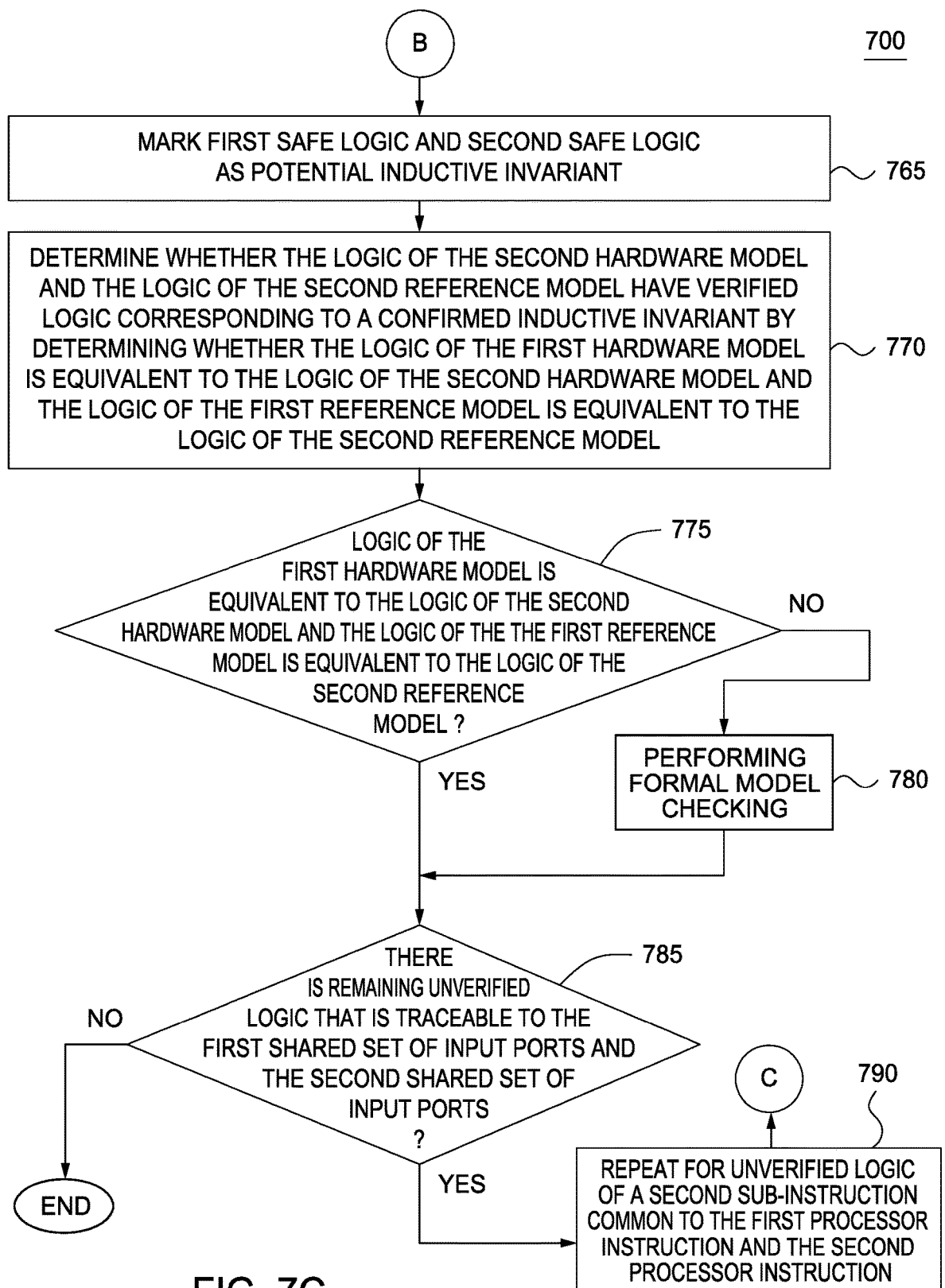

FIG. 7A-7C illustrate one embodiment of a method 700 for incremental model checking verification of similar computer instructions. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by the incremental model verifier 250 of FIG. 2.

At block 705, the incremental model verifier 250 receives a first hardware model and a first reference model corresponding to a first processor instruction. The first hardware model and the first reference model each have verified logic. The first hardware model has a first plurality of input ports and the first reference model has a second plurality of input ports. The first hardware mode and the second hardware model may be in the form of corresponding netlists 215. At block 710, the incremental model verifier 250 receives a second hardware model and a second reference model corresponding to a second processor instruction. The second hardware model and the second reference model each have unverified logic. The second hardware model has a third plurality of input ports and the second reference model has a fourth plurality of input ports. The first reference mode and the second reference model may be in the form of corresponding netlists 215.

At block 715, the port analyzer 220 of the incremental model verifier 250 identifies a first set of input ports that differ between the first plurality of input ports and the third plurality of input ports. At block 720, the port analyzer 220 identifies the remaining ports of the first set as a first shared set of input ports that are common to the first plurality of input ports and the third plurality of input ports. At block 725, the port analyzer 220 identifies a second set of input ports that differ between the second plurality of input ports and the fourth plurality of input ports. At block 730, the port analyzer 220 identifies the remaining ports of the second set as a second shared set of input ports that are common to the second plurality of input ports and the fourth plurality of input ports.

At block 735, the selection logic 230 of the incremental model verifier 250 selects logic of the first hardware model corresponding to a sub-instruction of the first processor instruction and logic of the second hardware model corresponding to the sub-instruction of the second processor instruction that are each traceable to the first shared set of input ports as first safe logic. At block 740, the selection logic 230 selects logic of the first hardware model of the first processor instruction and logic of the second hardware model of the second processor instruction that are each traceable to the first set of input ports that differ as first risky logic. At block 745, the selection logic 230 selects logic of the first reference model corresponding to the sub-instruction of the first processor instruction and logic of the second reference model corresponding to the sub-instruction of the second processor instruction that are each traceable to the second shared set of input ports as second safe logic. At block 750, the selection logic 230 selects logic of the first reference model of the first processor instruction and logic of the second reference model of the second processor instruction that are each traceable to the second set of input ports that differ as second risky logic. Identification of logic that is traceable or not traceable to input ports that are common or input ports that differ is performed by the incremental model verifier 250 applying a tracer tool 225 to a specified to a pair of specified models.

If, at block 755, the selection logic 230 identifies a specified model as having risky logic, then at block 760, the formal model checker 235 of the incremental model verifier 250 performs formal model checking on the risky logic. If, at block 755, the selection logic 230 identifies a specified model as having safe logic, then at block 765, the inductive invariant identifier 240 of the incremental model verifier 250 mark the first safe logic and second safe logic as a potential inductive invariant. At block 770, the inductive invariant identifier 240 determines whether the logic of the second hardware model and the logic of the second reference model have verified logic corresponding to a confirmed inductive invariant by determining whether the logic of the first hardware model is equivalent to the logic of the second hardware model and the logic of the first reference model is equivalent to the logic of the second reference model. If, at block 775, the inductive invariant identifier 240 determines that the logic of the first hardware model is equivalent to the logic of the second hardware model and the logic of the first reference model is equivalent to the logic of the second reference model, then inductive invariant identifier 240 declares that the logic of the second hardware model and the logic of the second reference model have verified logic and is therefore an inductive invariant. Since the logic of the second hardware model and the logic of the second reference model have verified logic and is therefore an inductive invariant, then the inductive invariant identifier 240 foregoes formal model checking on the logic of the second hardware model and the logic of the second reference model. If, at block 775, the inductive invariant identifier 240 determines that the logic of the first hardware model is not equivalent to the logic of the second hardware model or the logic of the first reference model is not equivalent to the logic of the second reference model, then inductive invariant identifier 240 declares that the logic of the second hardware model and the logic of the second reference model retain unverified logic and is therefore not an inductive invariant. Since the logic of the second hardware model and the logic of the second reference model have unverified logic and is therefore an not inductive invariant, then at block 880, the inductive invariant identifier 240 directs the formal model checker 235 to perform formal model checking on the logic of the second hardware model and the logic of the second reference model. In an embodiment, the inductive invariant identifier 240 determines that the logic of the first hardware model is equivalent or not equivalent to the logic of the second hardware model and/or the logic of the first reference model is equivalent or is not equivalent to the logic of the second reference model by proving that the logic of the first hardware model produces the same outputs for the same inputs as the logic of the second hardware model and proving that the logic of the first reference model produces the same outputs for the same inputs as the logic of the second reference model. In an embodiment, proving that the logic of the first hardware model produces the same outputs for the same inputs as the logic of the second hardware model and proving that the logic of the first reference model produces the same outputs for the same inputs as the logic of the second reference model comprises the sequence equivalency checker 245 of the incremental model checker 250 applying a sequence equivalence checking method to the logic of the first hardware model and the logic of the second hardware model and applying the sequence equivalence checking method to the logic of the first reference model and the logic of the second reference model. In an embodiment, once the logic of the first/second hardware model and the first/second reference model has been verified as proven logic, the logic of the first/second hardware model and the first/second reference model can be fabricate an integrated circuit (e.g., a processor).

If, at block 785, the incremental model checker 250 determines that there is remaining unverified logic that is traceable to the first shared set of input ports and the second shared set of input ports, then at block 790, processing proceeds back to step 835 for unverified logic of a second sub-instruction common to the first processor instruction and the second processor instruction.

Figure 8:
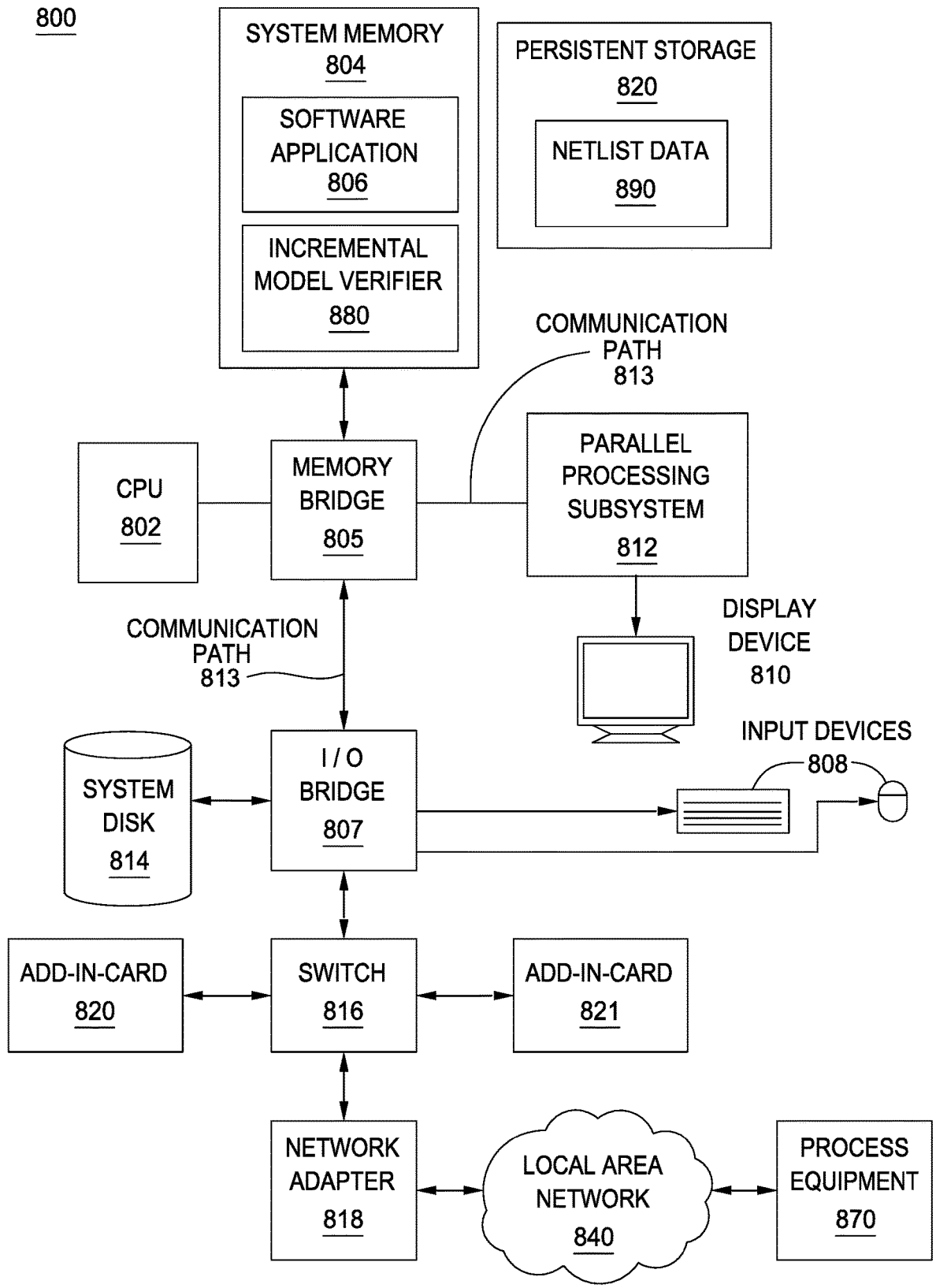
FIG. 8 illustrates an example computing system used for incremental model checking verification of similar computer instructions, according to embodiments of the present disclosure.

FIG. 8 illustrates an example computing system used for incremental model checking verification of similar computer instructions, according to embodiments of the present disclosure. In certain embodiments, computer system 800 is representative of the computer system 200. Aspects of computer system 800 may also be representative of other devices used to perform techniques described herein. For example, computing system 800 may be a personal computer, industrial processor, personal digital assistant, mobile phone, mobile device or any other device suitable for practicing one or more embodiments of the present invention.

The system 800 includes a central processing unit (CPU) 802 and a system memory 804 communicating via a bus path that may include a memory bridge 805. CPU 802 includes one or more processing cores, and, in operation, CPU 802 is the master processor of the system 800, controlling and coordinating operations of other system components. System memory 804 stores a software application 806, and data, for use by CPU 802. CPU 802 runs software applications and optionally an operating system.

Illustratively, the system memory 804 includes the incremental model verifier 980, which may correspond to the incremental model verifier 250, which performs operations related to performing incremental logic verification of similar computer instructions, according to techniques described herein.

Memory bridge 805, which may be, e.g., a Northbridge chip, is connected via a bus or other communication path (e.g., a HyperTransport link) to an I/O (input/output) bridge 807. I/O bridge 807, which may be, e.g., a Southbridge chip, receives user input from one or more user input devices 808 (e.g., keyboard, mouse, joystick, digitizer tablets, touch pads, touch screens, still or video cameras, motion sensors, and/or microphones) and forwards the input to CPU 802 via memory bridge 805.

A display processor 812 is coupled to the memory bridge 885 via a bus or other communication path (e.g., a PCI Express, Accelerated Graphics Port, or HyperTransport link); in one embodiment display processor 812 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 804.

Display processor 812 periodically delivers pixels of the dashboard to a display device 810 (e.g., a screen or conventional CRT, plasma, OLED, SED or LCD based monitor or television). Additionally, display processor 812 may output pixels to film recorders adapted to reproduce computer 800 with an analog or digital signal.

Persistent storage 820 is also connected to I/O bridge 807 and may be configured to store content and applications and data, such as a database library 815, for use by CPU 802 and display processor 812. Persistent storage 820 provides non-volatile storage for applications and data and may include fixed or removable hard disk drives, flash memory devices, and CD-ROM, DVD-ROM, Blu-ray, HD-DVD, or other magnetic, optical, or solid state storage devices. Illustratively, persistent storage 820 includes netlist data 890, which may comprise information acquired by the netlist optimizer 225.

A switch 816 provides connections between the I/O bridge 807 and other components such as a network adapter 818 and various add-in cards 820 and 821. Network adapter 818 allows the system 800 to communicate with other systems via an electronic communications network, and may include wired or wireless communication over local area networks 840 and wide area networks such as the Internet.

Other components (not shown), including USB or other port connections, film recording devices, or other suitable computing device, may also be connected to I/O bridge 807. For example, process equipment 870 may operate from instructions and/or data provided by CPU 802, system memory 804, or persistent storage 820. Communication paths interconnecting the various components in FIG. 8 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 812 incorporates circuitry optimized for performing mathematical operations, including, for example, math co-processor, and may additionally constitute a graphics processing unit (GPU). In another embodiment, display processor 812 incorporates circuitry optimized for general purpose processing. In yet another embodiment, display processor 812 may be integrated with one or more other system elements, such as the memory bridge 805, CPU 802, and I/O bridge 807 to form a system on chip (SoC). In still further embodiments, display processor 812 is omitted and software executed by CPU 802 performs the functions of display processor 812.

Pixel data can be provided to display processor 812 directly from CPU 802. In some embodiments, instructions and/or data representing a netlist incremental model verification is provided to set of server computers, each similar to the system 800, via network adapter 818 or system disk 814. The servers may perform operations on subsets of the data using the provided instructions for analysis. The results from these operations may be stored on computer-readable media in a digital format and optionally returned to the system 800 for further analysis or display. Similarly, data may be output to other systems for display, stored in a database library 815 on the system disk 814, or stored on computer-readable media in a digital format.

Alternatively, CPU 802 provides display processor 812 with data and/or instructions defining the desired output images, from which display processor 812 generates the pixel data of one or more output images, including characterizing and/or adjusting the offset between stereo image pairs. The data and/or instructions defining the desired output images can be stored in system memory 804 or graphics memory within display processor 812. CPU 802 and/or display processor 812 can employ any mathematical, function or technique known in the art to create one or more results from the provided data and instructions.

It will be appreciated that the system shown herein is illustrative and that variations and modifications are possible. The connection topology, including the number and arrangement of bridges, may be modified as desired. For instance, in some embodiments, system memory 804 is connected to CPU 802 directly rather than through a bridge, and other devices communicate with system memory 804 via memory bridge 805 and CPU 802. In other alternative topologies display processor 812 is connected to I/O bridge 807 or directly to CPU 802, rather than to memory bridge 805. In still other embodiments, I/O bridge 807 and memory bridge 805 might be integrated into a single chip. The particular components shown herein are optional; for instance, any number of add-in cards or peripheral devices might be supported. In some embodiments, the process equipment 870 may be connected directly to the I/O bridge 807. In some embodiments, the switch 816 is eliminated, and the network adapter 818 and the add-in cards 820, 821 connect directly to the I/O bridge 807.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and processor instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the incremental model verifier 250) or related data available in the cloud. For example, the incremental model verifier 250 could execute on a computing system in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for incremental model checking verification of a hardware instruction, comprising:
   receiving a first hardware model and a first reference model corresponding to a first processor instruction, the first hardware model and the first reference model each having verified logic, the first hardware model having a first plurality of input ports and the first reference model having a second plurality of input ports;
   receiving a second hardware model and a second reference model corresponding to a second processor instruction, the second hardware model and the second reference model each having unverified logic, the second hardware model having a third plurality of input ports and the second reference model having a fourth plurality of input ports;
   identifying a first shared set of input ports that are common to the first plurality of input ports and the third plurality of input ports;
   identifying a second shared set of input ports that are common to the second plurality of input ports and the fourth plurality of input ports;
   selecting logic of the first hardware model corresponding to a sub-instruction of the first processor instruction and logic of the second hardware model corresponding to the sub-instruction of the second processor instruction that are each traceable to the first shared set of input ports;
   selecting logic of the first reference model corresponding to the sub-instruction of the first processor instruction and logic of the second reference model corresponding to the sub-instruction of the second processor instruction that are each traceable to the second shared set of input ports; and
   determining that the logic of the second hardware model and the logic of the second reference model have verified logic by determining that the logic of the first hardware model is equivalent to the logic of the second hardware model and the logic of the first reference model is equivalent to the logic of the second reference model.

2. The method of claim 1, wherein when either or both of the logic of the first hardware model is not equivalent to the logic of the second hardware model or the logic of the first reference model is not equivalent to the logic of the second reference model, then performing formal model checking on the logic of the second hardware model and the logic of the second reference model.

3. The method of claim 1, wherein when the logic of the first hardware model is equivalent to the logic of the second hardware model and the logic of the first reference model is equivalent to the logic of the second reference model, then the logic of the second hardware model and the logic of the second reference model have verified logic.

4. The method of claim 3, further comprising foregoing formal model checking on the logic of the second hardware model and the logic of the second reference model.

5. The method of claim 1, wherein, when there is remaining unverified logic that is traceable to the first shared set of input ports and the second shared set of input ports,
   repeating said selecting logic of the first hardware model, said selecting logic of the first reference model, and said determining for unverified logic of a second sub-instruction common to the first processor instruction and the second processor instruction.

6. The method of claim 1, wherein determining that the logic of the second hardware model and the logic of the second reference model has verified logic comprises proving that the logic of the first hardware model produces the same outputs for the same inputs as the logic of the second hardware model and proving that the logic of the first reference model produces the same outputs for the same inputs as the logic of the second reference model.

7. The method of claim 1, wherein proving that the logic of the first hardware model produces the same outputs for the same inputs as the logic of the second hardware model and proving that the logic of the first reference model produces the same outputs for the same inputs as the logic of the second reference model comprises applying a sequence equivalence checking method to the logic of the first hardware model and the logic of the second hardware model and applying the sequence equivalence checking method to the logic of the first reference model and the logic of the second reference model.

8. The method of claim 1, wherein the method is performed on a first netlist of the first instruction and a second netlist of the second instruction.

9. The method of claim 1, wherein identifying a first shared set of input ports further comprises:
   identifying one or more first input ports that differ between the first plurality of input ports and the second plurality of input ports; and
   identifying one or more second input ports that differ between the third plurality of input ports and the fourth plurality of input ports.

10. The method of claim 9, further comprising applying a tracing tool to a first netlist representing the first computer instruction and a second netlist representing the second computer instruction to identify the first shared set of input ports, the second shared set of input ports, the one or more first input ports that differ, and the one or more second input ports that differ.

11. A system for incremental model checking verification, comprising:
   a computing processor; and
   a memory comprising a program that when executed by the processor is configured to: receive a first hardware model and a first reference model corresponding to a first processor instruction, the first hardware model and the first reference model each having verified logic, the first hardware model having a first plurality of input ports and the first reference model having a second plurality of input ports;
   receive a second hardware model and a second reference model corresponding to a second processor instruction, the second hardware model and the second reference model each having unverified logic, the second hardware model having a third plurality of input ports and the second reference model having a fourth plurality of input ports;
   identify a first shared set of input ports that are common to the first plurality of input ports and the third plurality of input ports;
   identify a second shared set of input ports that are common to the second plurality of input ports and the fourth plurality of input ports;
   select logic of the first hardware model corresponding to a sub-instruction of the first processor instruction and logic of the second hardware model corresponding to the sub-instruction of the second processor instruction that are each traceable to the first shared set of input ports;
   select logic of the first reference model corresponding to the sub-instruction of the first processor instruction and logic of the second reference model corresponding to the sub-instruction of the second processor instruction that are each traceable to the second shared set of input ports; and
   determine that the logic of the second hardware model and the logic of the second reference model have verified logic by determining that the logic of the first hardware model is equivalent to the logic of the second hardware model and the logic of the first reference model is equivalent to the logic of the second reference model.

12. The system of claim 11, wherein when the logic of the first hardware model is equivalent to the logic of the second hardware model and the logic of the first reference model is equivalent to the logic of the second reference model, then the logic of the second hardware model and the logic of the second reference model have verified logic.

13. The system of claim 11, wherein, when there is remaining unverified logic that is traceable to the first shared set of input ports and the second shared set of input ports, repeating said selecting logic of the first hardware model, said selecting logic of the first reference model, and said determining for unverified logic of a second sub-instruction common to the first processor instruction and the second processor instruction.

14. The system of claim 11, wherein determining that the logic of the second hardware model and the logic of the second reference model has verified logic comprises proving that the logic of the first hardware model produces the same outputs for the same inputs as the logic of the second hardware model and proving that the logic of the first reference model produces the same outputs for the same inputs as the logic of the second reference model.

15. The system of claim 11, wherein proving that the logic of the first hardware model produces the same outputs for the same inputs as the logic of the second hardware model and proving that the logic of the first reference model produces the same outputs for the same inputs as the logic of the second reference model comprises applying a sequence equivalence checking method to the logic of the first hardware model and the logic of the second hardware model and applying the sequence equivalence checking method to the logic of the first reference model and the logic of the second reference model.

16. A computer program product for incremental model checking verification, the computer program product comprising:
   a computer-readable storage medium having computer-readable program code embodied therewith, the computer-readable program code executable by one or more computer processors to:
   receive a first hardware model and a first reference model corresponding to a first processor instruction, the first hardware model and the first reference model each having verified logic, the first hardware model having a first plurality of input ports and the first reference model having a second plurality of input ports;
   receive a second hardware model and a second reference model corresponding to a second processor instruction, the second hardware model and the second reference model each having unverified logic, the second hardware model having a third plurality of input ports and the second reference model having a fourth plurality of input ports;
   identify a first shared set of input ports that are common to the first plurality of input ports and the third plurality of input ports;
   identify a second shared set of input ports that are common to the second plurality of input ports and the fourth plurality of input ports;
   select logic of the first hardware model corresponding to a sub-instruction of the first processor instruction and logic of the second hardware model corresponding to the sub-instruction of the second processor instruction that are each traceable to the first shared set of input ports;
   select logic of the first reference model corresponding to the sub-instruction of the first processor instruction and logic of the second reference model corresponding to the sub-instruction of the second processor instruction that are each traceable to the second shared set of input ports; and
   determine that the logic of the second hardware model and the logic of the second reference model have verified logic by determining that the logic of the first hardware model is equivalent to the logic of the second hardware model and the logic of the first reference model is equivalent to the logic of the second reference model.

17. The computer program product of claim 16, wherein when the logic of the first hardware model is equivalent to the logic of the second hardware model and the logic of the first reference model is equivalent to the logic of the second reference model, then the logic of the second hardware model and the logic of the second reference model have verified logic.

18. The computer program product of claim 16, wherein, when there is remaining unverified logic that is traceable to the first shared set of input ports and the second shared set of input ports,
repeating said selecting logic of the first hardware model, said selecting logic of the first reference model, and said determining for unverified logic of a second sub-instruction common to the first processor instruction and the second processor instruction.

19. The computer program product of claim 16, wherein determining that the logic of the second hardware model and the logic of the second reference model has verified logic comprises proving that the logic of the first hardware model produces the same outputs for the same inputs as the logic of the second hardware model and proving that the logic of the first reference model produces the same outputs for the same inputs as the logic of the second reference model.

20. The computer program product of claim 16, wherein proving that the logic of the first hardware model produces the same outputs for the same inputs as the logic of the second hardware model and proving that the logic of the first reference model produces the same outputs for the same inputs as the logic of the second reference model comprises applying a sequence equivalence checking method to the logic of the first hardware model and the logic of the second hardware model and applying the sequence equivalence checking method to the logic of the first reference model and the logic of the second reference model.

\* \* \* \* \*